United States Patent [19]

Burge

[11] 4,027,572
[45] June 7, 1977

[54] THEFT-PREVENTION SCREW FASTENINGS

[76] Inventor: William G. Burge, 955 Seven Hills Ranch Road, Walnut Creek, Calif. 94596

[22] Filed: May 13, 1974

[21] Appl. No.: 469,246

[52] U.S. Cl. .................................. 85/32 R; 85/45; 81/90 C; 145/50 A
[51] Int. Cl.² .................... B25B 15/00; F16B 23/00
[58] Field of Search ........... 85/45, 32 R; 145/50 A; 81/90 C, 71

[56] References Cited
UNITED STATES PATENTS

| | | | |
|---|---|---|---|
| 641,191 | 1/1900 | Champion | 85/32 R |
| 1,447,564 | 3/1923 | Norlund et al. | 85/32 R |
| 2,316,695 | 4/1943 | Jaffa | 85/32 R |
| 3,140,625 | 7/1964 | Pannozzo | 81/90 C |
| 3,412,635 | 11/1968 | Chmielewski | 81/90 C |
| 3,519,979 | 7/1970 | Bodensdein | 85/45 |

FOREIGN PATENTS OR APPLICATIONS

| | | | |
|---|---|---|---|
| 948,413 | 1/1949 | France | 85/45 |
| 881,129 | 6/1953 | Germany | 85/45 |
| 480,235 | 4/1953 | Italy | 85/45 |

Primary Examiner—Marion Parsons, Jr.
Attorney, Agent, or Firm—John Walker

[57] ABSTRACT

A nut or bolt which requires a special tool for its removal. The engaging element of the nut or bolt and the manipulating tool consisting of matching dowel holes, and pins which also function as keys, the pins and dowel holes being arranged in a random pattern.

5 Claims, 5 Drawing Figures

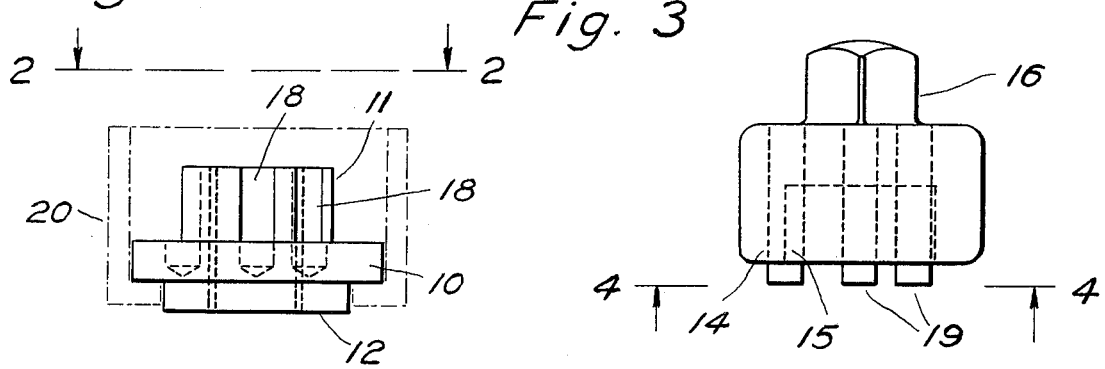
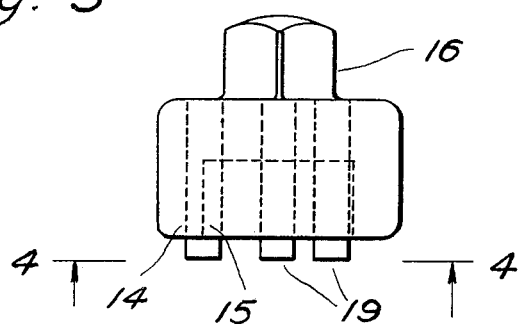
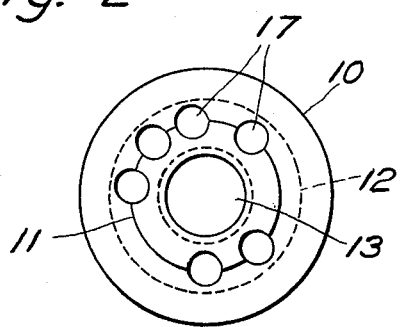
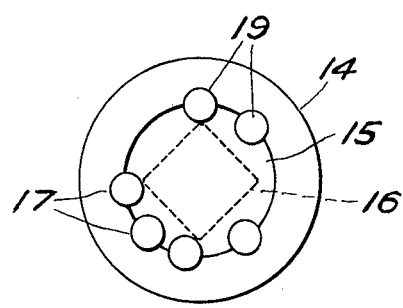
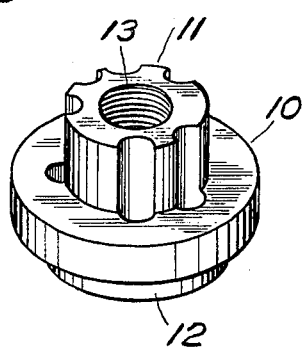

THEFT-PREVENTION SCREW FASTENINGS

BRIEF SUMMARY OF THE INVENTION.

Theft of automobile components such as wheels and batteries, also bicycle parts, and even larger units such as entire engines removed from tractors left unattended overnight, has increased to the point that a need has been created for some effective means of curbing such activities. A search of the art reveals the fact that this need has been recognized for some time, and that various suggestions have been made to fill it.

One such disclosure is made in U.S. Pat. No. 3,241,408 to Mccauley, however, the machining operation necessary for the production of this design is somewhat complicated. Another method of producing a locking device of the type in question is to be found in U.S. Pat. No. 2,286,950 to Breedlove. In this design, the nut is provided with a plurality of apertures which are engaged by similarly spaced pins in what is referred to as "the applying tool". While this nut and tool combination presents no unusual production problems, it has been found to be unsatisfactory as the pins will be sheared off long before they are able to transmit the torque necessary to adequately tighten a nut. This is especially true where the use of heavy equipment is concerned.

It is the object of the present invention to provide a combination of screw fastening means and manipulating tool which will offer the safety features of the above mentioned designs, and will be of adequate strength to withstand any and all stresses to which it could be reasonably subjected.

Another object of the invention is the provision of a combination which can be produced at a price which will make it commercially acceptable.

These and other objects of the invention will become apparent during the course of the following description and appended claims, taken in connection with the accompanying drawing forming a part hereof.

BRIEF DESCRIPTION OF THE DRAWING.

FIG. 1 is an elevation of the nut of my design.

FIG. 2 is a plan view of the nut as seen from line 2 — 2 of FIG. 1.

FIG. 3 is an elevation of the driving tool of my combination.

FIG. 4 is a plan view of the tool as seen from line 4 — 4 of FIG. 3.

FIG. 5 is a perspective view of the nut shown on FIGS. 1 and 2.

Referring to the drawing in detail, an upper hub or boss 11, which forms the body of the nut, is provided with a flange 10 and a lower hub or boss 12. The nut is drilled and threaded in the usual manner as is indicated at 13.

Attention is now directed to FIGS. 3 and 4 which illustrate the wrench or tool which is of the socket wrench type, for manipulation of the nut. This tool consists of a body 14 of relatively short cylindrical configuration having a circular, concentric recess 15 in its under side. The upper side of the body 14 is provided with a square projection 16, which enables the tool to be rotated by any suitable means.

In the manufacture of the two above described elements, the tool 14 can be applied to the nut, the boss 11 fitting closely into the recess 15 of the tool. With the two parts so united, a series of holes 17 can then be drilled on a pitch circle substantially equal to the diameter of the boss 11 and the recess 15. These holes will be of unequal peripheral spacing and will result in a plurality of semicircular grooves 18 in the exterior of the boss 11 and a matching arrangement of similar grooves in the interior of the recess 15. These grooves can be considered as spline ways, both in application and function.

Pins 19 will be inserted into the holes 17 of the tool 14, these pins having their upper ends knurled or otherwise deformed in order that they may be tightly driven and become an integral part of the tool. These pins will extend downwardly in key and keyseat relationship with the grooves in the recess 15. They will project slightly beyond the under side of the tool, and are adapted to engage the bottom of the holes 17 which have been drilled a short distance into the upper face of the flange 10 of the nut.

From the foregoing it will be apparent that any stresses tending to rotate the nut, by means of the tool, will not only be withstood by the aforesaid key and keyseat relationship of the pins 19 and grooves 18, but also by the dowel-like engagement of the projecting ends of the pins 19 and the apertures 17 in the flange 10.

The use of any other tool or device to effect removal of the nut is prevented by a loosely fitting, inner flanged sleeve 20 as is indicated in phantom on FIG. 1, this arrangement being disclosed by Pat. No. 641,191 to Champion.

While spacing of the pins by small increments, made at random, will permit of a great number of permutations, this number can be extended almost indefinitely by also making small changes in the radial spacing of the pins. Regardless of the spacing used, the simultaneous drilling of the tool and nut will always ensure a perfect matching of the two elements.

From the foregoing it should be apparent that I have provided a design of thief-proof screwed fastening that is entirely practical both from the standpoint of ease of manufacture, and adequacy with regard to strength. While I have illustrated and described a preferred embodiment of my invention, it will be understood that modifications may be made within the spirit and intent of Title 35, United States Code, Section 112, Paragraph 3.

I claim:

1. A nut-manipulating means consisting of a socket-type wrench having a circular recess in one end thereof, a plurality of pins mounted in said recess in key and keyseat relationship therewith, said pins being spaced around the interior curved surface of said recess in a random pattern, the longitudinal straight edges of the limits of the contiguous surfaces of that portion of said pins with the circular recess of said wrench being parallel and being substantially coincident with the plane of maximum resistance to longitudinal shear of said pins, said pins extending beyond the lower face of said wrench whereby transverse shear resistance is a further potential provision.

2. The combination of a nut manipulating means as in claim 1 and a screw fastening device comprising a cylindrical body having a plurality of spline ways of uniform transverse cross section spaced around, and extending longitudinally, throughout the length of the curved surface thereof, and being of a random pattern relative to the angularity of their spacing, and a concentric flange at the lower end of said cylindrical body extending outwardly therefrom, and having apertures in axial alignment with, and being complimentary to, both in form and dimension, the spline ways of said cylindrical body.

3. A theft-prevention screw fastening device having a special tool-engaging portion, and further means adapted to prevent its removal by the use of conventional tools, wherein the improvement consists of a tool-engaging portion having the following described structure; a cylindrical body having a plurality of spline ways of uniform transverse cross section spaced around, and extending longitudinally, throughout the length of the curved surfaces thereof, and being of random pattern relative to the angularity of their spacing, and a concentric flange at the lower end of said cylindrical body extending outwardly therefrom, and having apertures in axial alignment therewith, and being complimentary to, both in form and dimension, the spline ways of said cylindrical body, whereby only a specially designed tool can be utilized for the application or removal of the device, the actuating elements of the tool being subjected to transverse shear by their insertion in said apertures, and being further subjected to longitudinal shear by the action of said spline ways.

4. A fastening device as in claim 3 wherein said tool-engaging portion has a centrally disposed threaded aperture.

5. A fastening device as in claim 3 said tool-engaging portion having a threaded extension adapted to form a bolt.

* * * * *